United States Patent [19]

Nguyen et al.

[11] Patent Number: 4,588,486

[45] Date of Patent: May 13, 1986

[54] ETCHING OF ALUMINUM CAPACITOR FOIL

[75] Inventors: Trung H. Nguyen, Williamstown, Mass.; Clinton E. Hutchins, Pownal, Vt.

[73] Assignee: Sprague Electric Company, North Adams, Mass.

[21] Appl. No.: 725,180

[22] Filed: Apr. 19, 1985

[51] Int. Cl.$^4$ ............................................. C25F 3/04
[52] U.S. Cl. .......................... 204/129.43; 204/129.75
[58] Field of Search ...................... 204/129.75, 129.43

[56] References Cited

U.S. PATENT DOCUMENTS

| | | | |
|---|---|---|---|
| 3,085,950 | 4/1963 | Thomas et al. | 204/129.75 |
| 3,284,326 | 11/1966 | Martin | 204/129.75 |
| 3,520,788 | 7/1970 | Paehr | 204/129.75 |
| 4,484,252 | 11/1984 | Ruijgrok | 361/433 |

FOREIGN PATENT DOCUMENTS

| | | | |
|---|---|---|---|
| 914836 | 1/1963 | United Kingdom | 204/129.75 |
| 907089 | 2/1982 | U.S.S.R. | 204/129.75 |

*Primary Examiner*—T. M. Tufariello

[57] ABSTRACT

Aluminum capacitor foil is etched by passing it through a bath of electrolyte under the influence of pulsed direct current. The pulse duration is at least nine times as long as the interval between pulses when the current falls to zero and is preferably 3 to 27 milliseconds. The pulse current density is 2 to 10 A/in$^2$, etching temperature is 50° to 90° C., and the electrolyte is an aqueous solution containing sodium chloride and sodium sulfate.

6 Claims, No Drawings

ETCHING OF ALUMINUM CAPACITOR FOIL

BACKGROUND OF THE INVENTION

This invention relates to the etching of aluminum capacitor foil using a pulsed direct current which falls to zero in the intervals between pulses. The duration of each pulse is at least nine times as long as the length of the interval and is preferably 3 to 27 milliseconds. The electrolyte is an aqueous solution of sodium chloride and sodium sulfate. The process is carried out at 50 to 90° C. and at a pulse current density of 2 to 10 A/in$^2$.

It is desirable to use pulsed direct current to etch aluminum foil for low voltage use, e.g., 0–100 V formations, because it gives a foil which has a higher capacitance than that obtainable with conventional direct current or alternating current etching for formation voltages in the above range and particularly for 60 V formation or lower.

It has been known to use direct current pulses to etch aluminum foil. Generally, the current does not drop to zero between pulses so there is always current flowing to the foil. When a pulsed current is used where the current does drop to zero, the pulse time is so short as to be impractical with the commercial power supplies presently available. Other pulsed processes involve the use of heavy metal salts which present disposal, if not toxicity, problems.

SUMMARY OF THE INVENTION

It is an object of this invention to etch aluminum capacitor foil by a pulsed direct current process which can use commercially available power supplies and presents no unusual waste disposal problems. This object is attained by using a pulse having a duration which is at least nine times that of the interval between pulses during which the current falls to zero in conjunction with an aqueous sodium chloride-sodium sulfate electrolyte bath.

As noted above, prior art processes have used very short interval or off-times which require special power supplies. The present process was developed specifically to use regular, commercially available power supplies. However, the minimum interval or off-time is much longer with these power supplies than is taught by the prior art, and it was found that prior processes were unsatisfactory if used with commercial power supplies.

The preferred pulse is an unsymmetrical, pure direct current obtained preferably from three single phase waves to simulate a square waveform. It is at least nine times that of the interval between pulses and is preferably of 3 to 27 milliseconds duration. The duration of the intervals is preferably at most 3 milliseconds. This combination is particularly applicable to the production of low-voltage foil, e.g., that which is anodized to 100 V or less, and produces a high-gain, high-strength foil.

The electrolyte bath is an aqueous solution of sodium chloride and sodium sulfate; the sodium chloride concentration is between 50 g/l and its saturation amount, and the sodium sulfate concentration is 5 to 75 g/l. The sodium sulfate must be present to be able to use an interval duration of 3 msec, the minimum off-time of commercially available pulse power supplies. There is a strong economic advantage to be gained in using such available power supplies without modifying them. It is also advantageous to be able to use this minimum off-time as little associated equipment modification is needed also.

The current density of the applied pulse is 2 to 10 A/in$^2$, and etching takes place during the applied pulse or application of positive potential. During the interval when the current falls to zero, the potential falls below the pitting corrosion level which causes a slowdown in etching and a change in kinetics which seems to passivate the etch sites. When the next pulse is applied, etching takes place at a new site rather than propagating an already formed pit. The temperature of the etchant bath is 50° to 90° C. Above and below both the current density and temperature ranges, the capacitance gain (or increase in capacitance) upon anodization is very low.

DESCRIPTION OF THE PREFERRED EMBODIMENTS

Aluminum electrolytic capacitor foil is etched by passing the foil through an aqueous bath containing sodium chloride and sodium sulfate while under the influence of a pulsed direct current in which the pulses are at least nine times the length of the interval between pulses during which the current falls to zero. The electrolyte contains 50 g/l to the saturation amount of sodium chloride and 5 to 75 g/l of sodium sulfate. The current density is 2 to 10 A/in$^2$, and etching is carried out at 50 to 90° C.

Early experiments on pulsed DC etching utilized a sodium chloride electrolyte (250 g/l) at 70° C. and 11 A/in$^2$ current density. Highest capacitance was attained at a pulse duration of 9 msec and a pulse interval of 1 msec, i.e., 600, 185 and 27.0 μF/in$^2$ for 10, 30 and 100 V formations, respectively. Increasing the interval to 3 msec, drastically reduced capacitance to 102, 29 and 4.6 μF/in$^2$, respectively. Increasing the pulse duration to 27 msec with an interval of 3 msec increased capacitance only slightly to 189, 41 and 5.3 μF/in$^2$ which is still far lower than that obtained at a 9 msec pulse duration and a 1 msec interval.

Unfortunately, commercially available pulse power supplies have a minimum interval or off-time of 3 msec. Attempts to increase the capacitance obtained with a sodium chloride electrolyte and a 3 msec off-time were unsuccessful. Examination of the foil etch structure indicated large pit sites which are localized and few in number.

It was believed that this etch structure might be the result of the longer chemical etching period during the interval which, instead of passivating the etch sites, made existing etch sites more active than potentially new etch sites on the foil surface. Accordingly, an anodizing agent was added to the etching electrolyte to passivate the inside of the pits already produced. Since the main etchant, sodium chloride, is a neutral solution, a relatively neutral additive was used, namely sodium sulfate. Indeed, it was found that higher capacitance was obtained in neutral solution rather than acidic solution. Therefore, the anodizing additive should be in the form of a neutral salt.

A series of experiments at 70° to 90° C., 9 to 27 msec pulse duration, 1 to 9 msec interval time, and 3 to 11 A/in$^2$ current density in an electrolyte containing 250 g/l sodium chloride and 30 g/l sodium sulfate showed that a combination of a long pulse duration and a short pulse interval gave the highest capacitance.

The use of the anodizing additive with the longer interval time did ensure the continuous initiation of new sites without propagation of existing pits so that all pits are etched to about the same depth. This leaves a central unetched zone or metal core which ensures acceptable foil bend strength as the foil is not perforated as would be the case if the exisiting pits were propagated.

Since commercial pulse power supplies also have a maximum pulse duration of 27 msec, the 27-3 msec on-off time was investigated. Hard and soft temper aluminum foils behave differently as does foil from different suppliers. The preferred operating conditions for soft foil are a 27-3 msec on-off time, a current density of 3.5 A/in$^2$, an electrolyte containing 250 g/l of sodium chloride and 25 g/l sodium sulfate, and a temperature of 70° C. The capacitance results were 640, 225 and 43.5 $\mu$F/in$^2$ for 10, 30 and 100 V standard phosphate formations, respectively, and 655, 270 and 54.5 $\mu$F/in$^2$ for adipate formations, respectively.

What is claimed is:

1. A process for electrochemical etching of aluminum capacitor foil comprising passing said foil through a bath of electrolyte while under the influence of direct current pulses having an interval between each of said pulses, said bath being an aqueous solution containing 50 g/l to the saturation amount of sodium chloride and 5 to 75 g/l of sodium sulfate, said pulses having a duration of at least nine times that of said interval and having a current density of 2 to 10 A/in$^2$, and said etching being carried out at 50° to 90° C.

2. A process according to claim 1 wherein said direct current falls to zero during said interval.

3. A process according to claim 2 wherein said interval is at most three milliseconds.

4. A process according to claim 3 wherein said duration is 3 to 27 milliseconds.

5. A process according to claim 1 wherein said electrolyte contains 250 g/l of sodium chloride and 25 g/l of sodium sulfate, said temperature is 70° C., said interval is 3 milliseconds, and said current density is 3.5 A/in$^2$.

6. A process according to claim 1 wherein a simulated square waveform provides an unsymmetrical direct current pulse.

* * * * *